United States Patent [19]

Bond et al.

[11] Patent Number: 5,203,105
[45] Date of Patent: Apr. 20, 1993

[54] HORSE HEAD FISHING LURE

[75] Inventors: A. Melvin Bond; Jerry M. Bond, both of Denver, Iowa

[73] Assignee: Do-It Corporation, Denver, Iowa

[21] Appl. No.: 936,897

[22] Filed: Aug. 27, 1992

[51] Int. Cl.$^5$ .............................................. A01K 85/00
[52] U.S. Cl. .................................... 43/42.39; 43/42.28
[58] Field of Search ................. 43/42.39, 42.11, 42.28, 43/42.13, 42.37

[56] References Cited

U.S. PATENT DOCUMENTS

| D. 191,051 | 8/1961 | Miller | 43/423.7 |
|---|---|---|---|
| 1,503,400 | 7/1924 | Webb . | |
| 2,482,648 | 9/1949 | Brandt . | |
| 2,589,007 | 3/1952 | Landon . | |
| 2,775,840 | 1/1957 | Dumas . | |
| 2,778,144 | 1/1957 | Jones | 43/42.28 |
| 2,825,172 | 3/1958 | Bohley . | |
| 2,829,462 | 4/1958 | Stokes . | |
| 3,197,909 | 8/1965 | Adams . | |
| 3,253,363 | 5/1966 | Steehn . | |
| 3,313,059 | 4/1967 | Jures . | |
| 3,579,892 | 5/1971 | Olvey, Sr. . | |
| 3,828,463 | 8/1974 | Perrin . | |
| 3,855,722 | 12/1974 | Moore . | |
| 3,858,343 | 1/1975 | Goforth | 43/42.28 |
| 4,341,032 | 7/1982 | Olszewski . | |
| 4,530,180 | 7/1985 | Gwaldracz, Sr. | 43/42.28 |
| 4,713,907 | 12/1987 | Dudek . | |
| 5,136,801 | 8/1992 | Pond | 43/42.39 |

OTHER PUBLICATIONS

Trademark Registration No. 1,577,913 to Blakemore Sales Corp.
Trademark Registration No. 1,635,872 to KG Enterprises, Inc.
"Fishing with Artificial Lures" by Dick Sternberg, Copyright 1985.
"Anglers's Guide to Jigs and Jigging" by Kenn Oberrecht, Copyright 1982.
"Jigging for Crappies from Field and Sream" 1990, article by Jim McCafferty.

Primary Examiner—Kurt C. Rowan
Attorney, Agent, or Firm—Simmons, Perrine, Albright & Ellwood

[57] ABSTRACT

A horse head fishing lure features a weight in the shape of a horse head with an elongate head portion depending from a front of an elongate neck portion. A fish hook extends away from the rear of the neck portion. An eyelet for attaching a fish line extends from the top of the neck portion. A swivel is retained by and extends from the lowermost nose end of the head portion. A spinner blade would be attached to the swivel to be disposed adjacent the hook, yet free to spin beneath it when the lure is moved forward. The head portion is disposed at an acute included angle with respect to the neck portion. The acute angle of the head portion with respect to the neck portion locates a line of action between the eyelet for attaching a fish line and the swivel behind the center of gravity of the lure, such that any pull on the line has a tendency to locate the center of gravity below the line of action to stabilize the lure during its movement in an upright position.

11 Claims, 1 Drawing Sheet

HORSE HEAD FISHING LURE

BACKGROUND OF THE INVENTION

This invention relates generally to fishing lures and particularly to the genus of fishing lures known and referred to as "horse head" jigs. Horse head lures or jigs have a weight distribution to cause their hooks to extend generally rearward with an attached swivel extending below the hook to support a spinner when in use.

Many type of lures may be included in an "arsenal" of an avid fisherman. Unique action or functionality may make any one of a number of lures more popular than others given certain fishing conditions. Horse head type lures, also known as "pony head jigs", are well known casting and jigging lures and are in some regions the lure of choice for walleye and smallmouth bass. Horse head lures are especially known, however, as effective lures for catching crappies. These lures are popular because of their success enjoyed in attracting and catching fish. Horse head lures are being marketed by a great number of lure makers under various trade names. The shape of the lures, though resembling somewhat the head of a horse, hence their name, also have an appearance and have typically the natural sizes of beetle larvae, also known as grub worms. These larvae are known to make excellent live bait. Moreover, the shape of the lures is an embodiment of functionality in at least two other, primarily structural respects. First of all, the shape has a center of gravity with respect to a fish line suspension of the lure which positions a gap of the hook in a generally vertical plane with a preferred upward orientation of the open gap. This orientation reduces the chance of the hook becoming snared in submersed logs, brush, weeds or other obstructions found in many preferred fishing waters. Also, the depending portion or head and nose of the horse head not only functions as a keel to orient the hook as described, but also offsets an attachment of a swivel downward with respect to the hook of the lure to position a spinner attached to the swivel directly below, yet clear of the lure's hook or any dressing thereon. This swivel position is not just fortuitously offset, but permits the spinner or spinner blade to twist freely next to the hook when the lure is moved through the water.

The horse head lures are used for casting. It is their action of moving through the water when either retrieved after having been cast that give the horse heads their effectiveness. The success rate of some known horse head lures tends to decrease, however, when strikes occur while the lures are being moved through the water at a rather rapid rate, but only under those conditions. When reeled in slowly or when moved intermittently and being substantially at rest when a strike occurs, the horse head lures are known to be successful "fish getters". As a result, they have become staple items in the arsenal of many fishermen.

Because of the popularity of horse head lures, the shapes of various known horse head lures made by different manufacturers are substantially the same. A "sea horse" type lure shows the head with its "nose" pointing slightly more forward in the direction of travel and in line with the neck portion, somewhat like the position of the head of a galloping horse. Generally, the action is similar when fishing with any of the known horse head type lures. The fishing is great as long as the lures are moved through the water with caution to avoid sustained rapid movement.

It is generally known that an important sensory stimulant which induces fish to "strike" is the motion of its prey or, hence, the motion of an artificial lure. Varying the speed at which the artificial lure moves through the water closely imitates the motion of the fish' prey seeking to escape or to protect itself. Therefore, it would be highly desirable to be able to fish with a lure which is not significantly limited in the speed at which it is moved through the water, and which is capable of hooking a fish even when it is struck by the fish during a spurt of movement through the water. It appears that particularly those desirable game fish, such as smallmouth bass, pike, or walleye, which by nature rely on their own swiftness of striking their prey, become more eager to strike at that moment when their pre starts to make a sudden move to escape and before it has moved out of reach. The ability to subject the lures to such sudden spurts of movement without apparently losing their effectiveness when a fish actually strikes during such movement would therefore be a significant improvement in horse head type lures. Because of the various advantageous functions of horse head type lures, it would be, of course, desirable to improve the usefulness of the horse head lures without compromising any of the known useful features of their shape.

SUMMARY OF THE INVENTION

It is therefore an object of the invention to provide a center balanced "horse head" lure which may be fished by moving it in a stabilized attitude at various speeds through the water.

It is another object of the invention to provide a horse head spinner jig which remains stable under various dynamic water conditions.

In accordance with the invention, a spinner jig type horse head artificial lure comprises a hook which has a hook portion and a shank portion. A weighted body portion of the lure is disposed about and attached to the shank portion of the hook. The weighted body portion has in a side view of the lure a generally arcuate shape. The arcuate shape of the body portion is formed by a neck portion and a head portion. The neck portion extends generally along the shank of the hook. The head portion of the arcuate body portion is turned back toward the neck portion and extends from the neck portion at an acute angle with respect to the shank of the hook toward the hook portion of the hook.

A line attachment device is disposed at an upper end of the neck portion. A swivel extends from a lower end of the head portion. A spinner blade may be attached to the swivel before the lure is placed into use for fishing.

A particular feature and distinct advantage of the lure configuration in accordance with the invention is that the center of gravity of the weighted body portion and of the lure as a whole lies forward of a straight line through the lure which extends from the line attachment device through the swivel.

Other features and advantages described with respect to a preferred embodiment of the invention will become apparent from the detailed description hereof which may be best understood when read in reference to the appended drawings.

DETAILED DESCRIPTION

1. DESCRIPTION OF FEATURES OF STATE OF THE ART HORSE HEAD LURES

Figure 1:
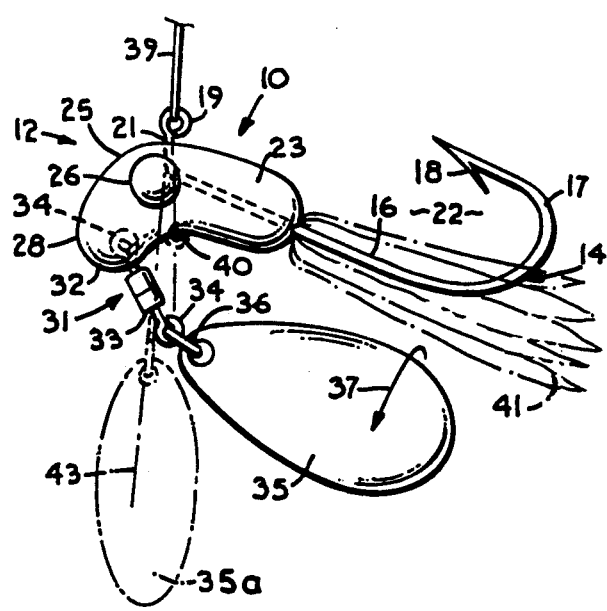
FIG. 1 shows a side view of a typical prior art horse head lure.

Referring now to FIG. 1, there is shown a side elevation of a state of the art lure 10 which is generally referred to as a "horse head" lure or horse head jig. The lure 10 of FIG. 1 is a highly successful, widely used lure. The name "horse head" is readily apparent as being derived from the shape of a weight 12 which is shown in a typical orientation, as the lure 10 would be suspended, at rest, from a fishing line, or as the lure 10 is being moved slowly through the water. This orientation gives the lure the appearance of a horse's head, for example, when a horse might be standing, with the horse's head held in a normal head position.

A hook 14 of the lure 10 includes a shank or shank portion 16 and a hook portion 17 at a tail end thereof. The end of the hook portion 17 features a typical barb 18 by which a fish would be retained once the hook becomes lodged in the fish's mouth. An end of the shank 16 opposite the hook portion 17 provides an attachment for a line, which is typically a formed eyelet 19, as shown. Hooks made and provided by hook manufacturers for horse head lures, in contrast to straight fish hooks, also feature an eye shank end 21 which is a bent portion 21 at an end of the shank 16. The eye shank end 21 or eye shank 21 extends at an angle which may be regarded substantially a right angle to the generally longitudinally extent of the shank 16 of the hook 14. Depending on who is the manufacturer of the jig hook, the angle of the eye shank with respect to the shank 16 may vary from a right angle by ten or twenty degrees. However, the eye shank 21 gives the appearance of forming substantially a right angle with the shank 16. The eye shank 21 is also formed to the same side as that at which a gap 22 of the hook 14 is located. The eyelet 19 is consequently formed at an outer end of the eye shank 21 rather than in extension of the shank 16 of the hook (such coextensive configuration of the hook not being of interest hereto and not being shown). The bent-down portion or eye shank 21 of the hook 14 is particularly suited to permit a "neck portion" 23 of the weight 12 to interiorly encase portions of the shank 16 and of the eye shank 21 such that the eyelet 19 is disposed adjacent an uppermost neck and head juncture 25 of the horse's head configuration. The portion of the shank 16 adjacent the eye shank 21 extends through the neck portion 23 somewhat in the longitudinal direction as a spinal column would extend along the neck of a horse.

The shank 16 of the hook 14 consequently extends through the neck portion 23 of the weight 12 in the shape of the horse's head such that the longitudinal shape of the neck portion 23 of the weight 12 is disposed generally coextensively with the longitudinal direction in which the shank 16 extends from the neck portion 23 toward the rear of the weight 12. The shape of the horse head lure 10 is further characterized by typical, bulging eyes 26, one being located on each side of the lure 10, and only the facing bulging eye 26 being shown in FIG. 1. Readily visible eye spots being well known fish attractants, the bulging eyes may additionally be painted in brightly visible colors, not shown.

A forward part 28 of the weight 12 is also recognized, and is referred to herein, as a "head portion" 28 of the weight 12. As shown in FIG. 1, the head portion 28 of the prior art lure 10 extends approximately at a right angle, or an included angle slightly greater than a right angle, away from the neck portion 23 and the longitudinal direction of the shank 16 of the hook 14. A swivel 31 is molded into and extends generally downward from a lower end 32 of the head portion 28 of the weight 12. Typically, the swivel has a center swivel joint 33 with swivel links 34 extending to both ends from the joint 33. The upper swivel link 34 is substantially molded into the lower end 32 of the head portion 28. The lower swivel link 34 is depending from the swivel joint 33. A spinner blade or spinner 35 is attached by a typical split ring 36 to the lower depending swivel link 34. When the lure 10 is moved through water, the design or shape of the spinner 35 is intended to cause the spinner 35 to begin to rotate or spin about a swivel axis of the lower swivel link 34. Such rotation is shown, for example, by an arrow 37. The shiny surfaces of the spinner 35 show off the motion of the spinner even under low lighting conditions in the water, such that fish become attracted to the lure 10 when the lure is pulled through water.

When the prior art lure 10 hangs motionless suspended from a fishing line 39, the spinner 35 may hang substantially downward as shown by the alternate position of the spinner 35a shown in phantom lines. At such time the hook 14 may be substantially in the orientation as shown in FIG. 1. When at rest, the lure 10 takes, of course, a position at which its center of gravity 40 (C.G.) is located directly below the point of suspension, namely the eyelet 19, the fishing line 39 being tied through the eyelet 19. No dynamic forces are involved. The shown rest orientation of the lure 10 is little affected by dressing 41 which may be applied to the hook to disguise the hook 14 and make the lure 10 more attractive to a fish by selected colors of such known dressing 41. The dressing 41 may consist of bristle type material or preferably of plastic streamers which have little mass and may have slightly lower or the same density as water.

When the lure 10 is moved cautiously through the water, such as when it is being reeled in slowly after having been cast, the spinner may take on an orientation as shown by the spinner 35 in FIG. 1. The spinner 35 also begins to rotate as shown by the arrow 37. As the speed of movement of the prior art lure 10 through the water increases, the speed of rotation of the spinner 35 also increases. The increased rotation by the spinner 35 also tends to increase its drag or force of resistance to the movement through the water. At a sharply increased speed of movement of the prior art lure 10 through the water the drag of the spinner becomes a major component of drag which opposes the pull on the fishing line 39. As can be seen from FIG. 1, the center of gravity 40 is disposed rearward of the swivel joint 33 as the lure 10 is being reeled in after having been cast.

When the lure 10 is, however, subjected to rapid movement, with the fishing line becoming positioned at an angle with respect to the vertical (such is the case when trolling the lure or when retrieving the lure toward shore), the line of travel of the lure 10 coincides more or less with a straight line between the eyelet 19 and the swivel center 33 as indicated at 43. This dynamic reorientation of the lure 10 causes its C.G. 40 to become labile or unstable, in that gravity would tend to pull it out of a position above the line of travel of the lure 10. Thus as the lure 10 spurts through the water at a speed at which the spinner 35 has become a major source of drag, the body of the lure 10 reorients itself to move through the water on its side. When seen from above during such rapid movement, the lure 10 would be seen in the same position as it is depicted in FIG. 1, with the plane of the figure being essentially the horizontal, of course. It is to be realized, that in such position the spinner 35 wants to take on the alternate orientation of the spinner as shown at 35a. The spinner 35a giving off much flickering during such fast movement, a fish is likely to strike at the glittering motion of the spinner 35. With such a strike, as can be seen from FIG. 1, the fish is likely to miss grasping the hook, and on recognizing the non-digestibility of the spinner, or at the latest when being reeled in, the fish simply releases the spinner, losing interest in the artificial bait.

The rapid forward movement of the prior art lure 10 in a sideward orientation also becomes more likely to expose the gap 22 of the hook portion 17 laterally to any weeds which are in the path of the advancing lure 10, such that the hook 14 would tend to get snagged in such weeds more readily, instead of bringing in a fish. However, during a recommended slow movement of the lure 10, during which the lure 10 orients the curvature of the hook 14 and its gap 22 in a vertical plane, the gap 22 of the hook 14 presents a low profile to vertically extending water weeds, and the lure 10 is disposed to advance smoothly between such vertically oriented grass type weeds without becoming snared.

2. DETAILED DESCRIPTION OF A PREFERRED EMBODIMENT OF THE INVENTION

Figure 2:
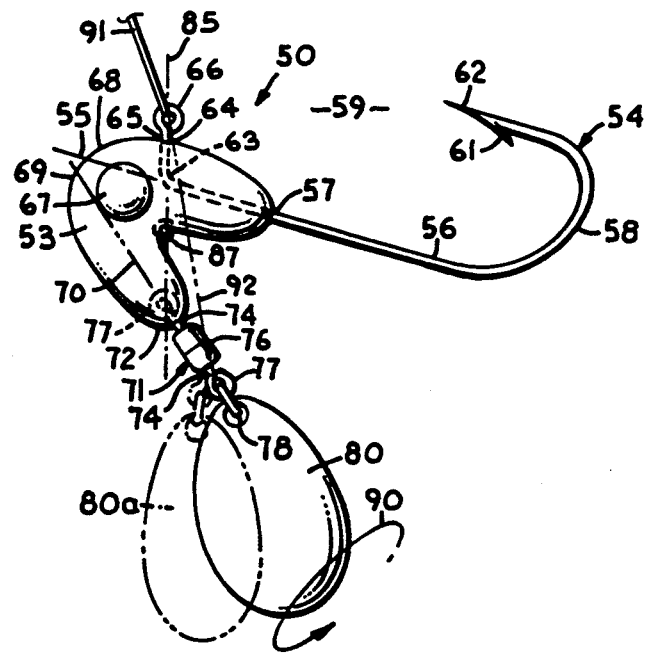
FIG. 2 shows a side view of a horse head type lure which depicts an embodiment of the present invention.

FIG. 2 shows a side elevation of a horse head type lure in accordance with the present invention, the lure being designated generally by the numeral 50. Relative directional terms are used in the sense of the positioning of the side elevation of the lure 50 on the drawing. A directional term "upward" indicates a direction toward the top of the drawing in FIG. 2, while "forward" or "front" is toward the left on the drawing. Conversely, the "rear" of the lure 50 denotes the part of the lure on the right hand side of the drawing.

The lure 50 includes a weight 51, which is shaped into a neck portion 52 and a head portion 53 of a horse head configuration. Typically the weight 51 is of a lead alloy which may be cast is a lead casting mold to the desired shape. A hook 54 is partially molded into the neck portion 52 to hold or retain the hook 54 in a preferred position with respect to the neck portion 52. The neck portion 52 is symmetrically formed with respect to a plane of symmetry which essentially bisects the lure 50 as a whole parallel to the plane of the drawing. A length of the neck portion 52 is defined as its dimension along a longitudinal axis 55 centrally through the elongate shape of the neck portion 52 and in the bisecting plane of symmetry through the lure 50. A rearward end of a shank or shank portion 56 of the hook 54 extends from the rear 57 of the neck portion 52 in the plane of symmetry and transitions into an arcuate hook portion 58 which curve back substantially parallel to the shank 56, forming a gap 59 with the shank. The planar spread of the ga 59 also lies ideally in the plane of symmetry of the lure 50. A typical barb 61 is disposed adjacent a pointed outer end 62 of the hook portion 58.

The weight 51 also holds a device for suspending the lure 50. The suspension device is located along the top surface of the neck portion 52 and in a position to balance the gravitational forces on the lure 50, such that the hook 54 extends generally to the rear of the lure 50 as shown in the drawing. This orientation of the lure presupposes locating a suspension provision centrally to balance the weight of the lure 50 centrally below the suspension point when the hook 54 is located in that generally rearward extending orientation. A convenient manner for providing such a suspension device is by using commercially available hooks which are known as jig hooks. Like already existing, prior art horse head lures, the hook 54 of the lure 50 is preferably also such a prior art jig hook. The use of a jig hook allows the weight to be formed about the hook in a manner that the hook 54 also provides the means for attaching the lure 50 to a line. On such a jig hook, a forward end 63 of the shank 56 is conveniently bent or formed at an angle which approximates a right angle with respect to the longitudinal shank 56 toward the gap 59 of the hook 54. Though varying from a right angle by about 10°, the angle may be considered a substantially right angle. The formed end is referred to herein as a eye shank 64. The bent eye shank 64 lies typically in the same plane as the hook portion 58. The hook 54 is positioned within the weight such that the bent eye shank 64 protrudes from the weight 51 at a top 65 of the weight 51. The bent shank of the eye shank 64 and the adjacent shank portion 56 provides added retainment for the hook 54 within the weight 51. An outer end or line end of the bent eye shank 64 is formed into a fishing line retainment 66, such as an eyelet 66. The jig hook 54 conveniently allows the suspension for the lure 50 to be jointly retained with the hook 54. It is to be understood that as a modification of the preferred embodiment, the eye shank 64 and the eyelet 66 might be an element separate from that of the hook 54. The horse head shape of the weight 51 may also feature an eye 67 predominantly on both sides of the lure 50. A front end or front 68 of the elongate neck portion 52 adjoins and blends into an upper end 69 of the also elongate head portion 53 which depends generally downward from the front 68 of the neck portion 52. Rounded blending of the neck and head portions 52 and 53 causes the overall shape of the weight 51 to have a curved profile in its side view, somewhat like that of a boomerang, or as the name implies, a horse's head. The length or longitudinal extent of the head portion 53 of the weight 51 is best regarded to be the length along a central longitudinal axis 70 through the elongate head portion 53. The axis 70 would also lie and define with the axis 55 the bisecting plane of symmetry of the lure 50.

A swivel 71 extends from a lower end 72 or the "nose" of the head portion 53. The swivel 71 is made up of typical swivel links 74 extending substantially axially outward toward opposite ends of the swivel 71, the swivel links being rotatably retained at mutually facing inner ends by a swivel joint 76. The swivel links 74 are capable of rotating about a longitudinal axis through the swivel 71 and are further capable of angular deflection from such longitudinal axis through a limited angle, depending, of course, on the manufacturer of the swivel. Swivels, such as the swivel 71, are known fishing tackle components which are commercially available from various sources. The outer ends of the swivel links 74 are provided with retention devices, such as typical eyelets 77. The eyelets 77 are loops formed from the outer ends of the wire-like swivel links 74. Of course, other retention devices than eyelets might be employed. The eyelet 77 of the upper swivel link 74 is embedded or molded into the head portion 53 which helps to secure the swivel 71 within the lower end 72 of the head portion 53 of the weight 51. The eyelet 77 of the lower swivel link 74 holds a retainer 78, such as split ring 78 shown in FIG. 2 as a preferred device to attach a spinner blade 80 to the swivel 71.

The head portion 53 of the weight 51 is formed as one leg of an acute angle with respect to the neck portion 52 of the weight 51. The pronounced rearward angle, in which the head portion 53 extends toward the rear in the direction toward the hook portion 58 of the hook 54 places the swivel joint 76 rearward of a vertical line 85 when the lure 50 is suspended by the eyelet 66 and hangs therefrom naturally. A centroid or center of gravity 87 (C.G.) of the lure 50 would, of course, be located on the vertical line 85 below its point of suspension. As is well known, when an object is allowed to freely swing from a point of suspension, its center of gravity aligns itself directly below the point of suspension. To more precisely locate the centroid 87 of the lure 50, a second suspension point may be selected, such as the curved portion 58 of the hook 54. A second vertical line (not shown) intersects with the vertical line 85 and locates the center of gravity 87 with reasonable accuracy. Because of the location of the center of gravity 87 being such that the hook 54 of the lure 50 is balanced to be disposed generally rearward when the lure 50 is suspended by the eyelet 66, the lure 50 also belongs to a class of lures which are referred to as center-balanced lures. As with the weight of the lure 10, which is also a center-balanced lure, the weight of the lure 50 is distributed in such a manner about the eyelet 66, such that the hook 54 does extend generally rearward when the lure is suspended by the eyelet 66 to depend freely from the eyelet.

FIG. 2 also shows that the swivel joint 76 and the lower swivel link 74 extending downward are located away from the vertical rearward or behind the center of gravity 87 and toward the hook portion 58. This location of the swivel link is in contrast with that of the lure 10 shown in FIG. 1. As the lure 50 is moved through water, the spinner blade or spinner 80 pivots from its rest position 80a (as shown in phantom lines) toward the hook and begins to spin with respect to the lure 50, the spinning motion as indicated by an arrow 90 is supported by a rotational freedom of movement of the lower swivel link 74 about its longitudinal axis within the swivel joint 76. During increasingly rapid movement of the lure 50 through water, the spinning action of the spinner 80 increases, and its drag increases approximately proportional to the square of the speed with which the lure 50 is moved through the water. During rapid movement, the drag of the spinner 80 becomes a major component or factor of the overall drag on the lure 50. Therefore, the pull of a fishing line 91 drawing at an inclined angle with respect to the vertical aligns the spinner blade 80 to trail substantially along a line of action 92 between the fishing line suspending eyelet 66 and the swivel joint 76 with the lower swivel link 74. This line of action is essentially a straight line disposed in the bisecting plane of symmetry through the lure 50 with the spinner 80 trailing along the rearward extension of the line of action 92. The pull by the fishing line 91 opposes the drag generated by the spinner blade 80. The line of action 92 extends between the centroid 87 of the lure 50 and the neck portion 52.

An inclined orientation or forward tilting of the lure 50 would then position the centroid or center of gravity 87 of the lure 50 below this line of action, hence into a stable position with respect to the orientation of the lure 50 during any kind of movement. The fishing lure 50 with its acute angle between the head portion 53 and the neck portion 52, consequently, has a naturally stable dynamic orientation in the vertical, when the lure 50 is moved through water at a rapid rate. The stable dynamic orientation of the lure 50 is in contrast to an unstable characteristic of prior art lures having a swivel joint forward of their respective centers of gravity. While prior art lures, such as the lure 10, may move at comparatively low rates through water without becoming tilted on their sides, the lure 50 exhibits the stability to maintain a vertical orientation, with the hook portion 58 remaining in a substantially vertical plane, over a full range of speeds or at desirably varied retrieval speeds. It is typically during such varied movements of retrieval of a cast lure that a fish may be induced to strike at the lure.

The structure of the lure 50 may be altered without departing from the scope of the invention. Various alterations as far as the size of the lure 50 may be routinely contemplated. Typically the weights of such lures may range from about one (1) gram or about 1/32 ounce to about 50 grams or about 1½ ounces. Hook sizes may be varied accordingly. These size changes are routine without risk of affecting the advantages and features of the invention. However, when contemplating any alterations in the shape of the weight 51, or in the acute included angle at which the head portion 53 extends from the neck portion 52 of the weight 51, any such change should be evaluated. It is to be realized that the rearward orientation of the head portion 53 is a dominating factor of structurally placing the center of gravity 87 forward with respect to the swivel 71 and particularly with respect to the center of the swivel joint 76 and the lower swivel link thereof. It is to be noted that during rapid movement of the lure 50 through water, the spinner 80 is substantially aligned with the center of the swivel joint 76 and with the extending lower swivel link 74. The head portion 53, therefore, is formed at an acute included angle in a preferred range of between 55° to 75° with respect to the neck portion 52 of the lure 50. The included angle may be less than 55°, in that a smaller included angle would also provide the advantages of the invention. A spinning clearance for the spinner 80 however, might be lost as the angle is appreciatively decreased to less than 5°. Increasing the included angle beyond 75° toward a right angle requires careful shaping of the weight 51 to make sure that the center of gravity is located with respect to the swivel 71. The actual angle of setback of the head portion 53 from a right angle may be defined in terms of the longitudinal axes through the neck and head portions 52 and 53. Its precise definition depends on the points of the lure weight 51 with respect to which the angle is measured. An important consideration in shaping the head portion 53 with respect to the neck portion 52, however, is to position the lower end 72 of the head portion 53 close to or preferably behind the vertical line 85, such that the swivel joint 76 and the lower extending swivel link 74 may be located decisively behind the line 85 along which the center of gravity 87 is located. The resulting configuration locates, conversely, the center of gravity ahead of a line of action of opposite pull and drag action the eyelet 66 and the spinner blade 80. With such constraints in mind, the angle may be measured generally by approximating the locations of the central axes 55 and 70 in the planar side elevations of the neck and head portions 52 and 53, for example. It is thereby possible to approximate and determine the size of the angle within about two or three degrees of deviation or error from a nominal, measured angle. The head portion 53 of the presently preferred embodiment forms an acute included angle of approximately 60° with the neck portion 52 and the outer extension of the shank 56 of the hook 54. In the preferred embodiment, the upper swivel link 74 is molded into the lower end 72 of the head portion 53 at an angle which corresponds substantially to the angle of the setback of the head portion 53 from a right angle with respect to the longitudinal extent of the neck portion 52, or its extension along the shank 56 of the hook 54. In designing the lower end 72 of the head portion 53, for molding the weight 51 about the hook 54 and the swivel link 74, cooling of the molten metal, such as lead, adjacent the lower end 72 should be taken into account. If the lower end 72 of the head portion 53 is shaped in too much of a point, the molten metal may cool too quickly in the outer extremity of the head portion and, consequently, not properly retain the upper swivel link 74. A reasonable amount of curved bluntness in the lower end 72 of the head portion 53 is therefore desirable.

On the other hand, it has also been found desirable to streamline the head portion 53 toward its lower end 72 with a taper to enhance the flow of water toward the spinner 80 rather than to present a partial shield by a very blunt "nose". The ready flow of water past the spinner blade 80, even when the lure 50 is being retrieved at low speeds, is desirable to induce the spinning action of the spinner blade 80 to cause it to contribute to call attention to the lure's presence.

Figure 3:
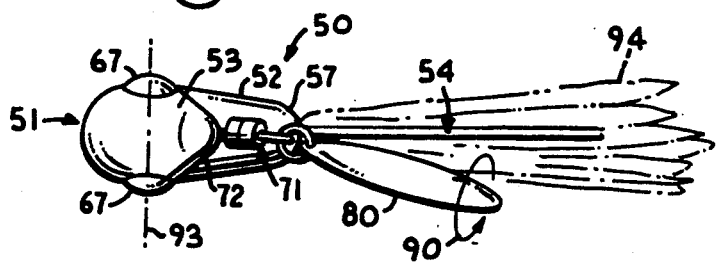
FIG. 3 shows a bottom view of the horse head type lure shown in FIG. 2.

Referring now to FIG. 3, there is shown a bottom view of the lure 50 to better illustrate the preferred streamlined or tapered shape of the lower end 72 of the head portion 53. The bottom view of the weight 51 also shows a comparatively wide frontal section across the eyes 67, as indicated at 93. Locating the desired maximum width of the weight 51 substantially across the frontal section 93 and having a tapering of the head portion 53, and to some extent also of the neck portion 52 away toward the lower end 72 and the rear 57, respectively, further contribute to the location of the center of gravity 87 forward of the swivel joint 76, as described. FIG. 3 also shows optional hook dressing 96 attached about the hook 54. The manner of attaching such dressing 96 to the hook 54 is a matter of choice and may be done to further induce a fish to strike as well as to hide the shape of the hook. The use of the optional dressing 96 may alter the drag characteristics of the lure 50 somewhat, just as it may alter the drag characteristics of a prior art lure, such as those of the lure 10 described with respect to FIG. 1. However, as the lure 50 shown in FIG. 3, for example, moves more rapidly, the spinning action of the spinner blade 80 and its drag tends to increase significantly, while drag produced by the dressing may increase only slightly. Such lesser increase in drag is believed to occur because of the flexibility of the dressing 96 and its ability to streamline as the movement of the lure 50 increases.

It should be realized that various changes and modifications may be made on or with respect to the lure 50 as described herein without departing from the spirit and scope of the disclosed invention. The typical colorful paint schemes applied to horse head lures are also applicable and useful on the described lure 50. It should be understood that particular paint schemes, or whether the hook dressing 94 is used, or other minor changes or modifications may be desirable. None of these changes should affect the described advantages of the invention as long as the described relationships of the backward bent head portion 53 with the line of action for the spinner 80 rearwardly of the center of gravity are adhered to.

It is claimed:

1. A horse head fishing lure comprising:
   a weight in the shape of an elongate neck portion with a front and rear, and an elongate head portion with upper and lower ends, the head portion extending with its upper end from the front of the neck portion downward at an acute included angle between the elongate neck and head portions;
   a hook having a shank and a hook portion, the hook portion curved back on the shank and forming a gap with the shank, the gap being disposed in a plane substantially bisecting the weight and coincident with longitudinal axes through the elongate neck and head portions, the shank extending partially within the neck portion of the weight, the hook retained by the neck portion in a generally rearward orientation and extending from the rear of the neck portion and having the hook portion disposed away from the weight;
   means for suspending the fishing lure, the suspending means mounted in the neck portion and extending from a top surface of the front of the neck portion above a centroid of the fishing lure when the hook is disposed in the generally rearward direction; and
   a swivel attached to the lower end of the head portion, the swivel including a swivel link extending generally downward away from the front of the neck portion and from the lower end of the head portion, the swivel link including means for attaching a spinner blade thereto, and disposed on the bisecting plane through the weight and rearward with respect to the centroid of the lure such that a line of action between the suspending means and the swivel link is disposed rearward of the centroid of the lure.

2. A fishing lure according to claim 1, wherein the included angle between the elongate neck and head portions lies in a range between 55° and 75°.

3. A fishing lure according to claim 2, wherein the hook is a jig hook having an eye shank formed at an end of the shank and substantially at a right angle with respect to the shank of the hook, the eye shank having an eyelet disposed at an outer end thereof, the eye shank and eyelet thereof constituting the means for suspending the lure.

4. A fishing lure according to claim 3, wherein the included angle between the elongate neck and head portions is substantially 60°.

5. A fishing lure according to claim 1, wherein the included angle between the elongate neck and head portions lies within a three degree deviation range from an angle of 60°.

6. A horse head fishing lure which comprises:

a hook having a hook portion with a gap at one end thereof, a shank portion at the other end, the shank portion having a line end opposite the hook portion, and means for attaching a fish line at the line end of the shank portion;

a swivel having a center swivel joint and having a two oppositely disposed swivel links, each swivel link extending mutually coextensively of the other, the swivel links having inner ends adjacent one another and outer ends extending away from each other, the swivel links having retention means disposed at the outer ends thereof and being rotatably held at the inner ends thereof by the swivel joint;

a weight comprising an elongate neck portion having a front and a rear and an elongate head portion having upper and lower ends, the upper end of the head portion being joined to the front of the neck portion and extending downward at an acute angle with respect to the neck portion from the front of the neck portion, the shank portion of the hook extending generally longitudinally through the neck portion and being retained thereby, the hook extending with the hook portion outward from the rear of the neck portion, the line end with the line attachment means protruding through an upper part of the neck portion opposite the downward extending head portion of the weight, a centroid of the lure being disposed below the line attachment means when the hook portion is extending generally horizontally outward from the rear of the neck portion, the lower end of the head portion retaining an upper one of the swivel links, the swivel extending from the retained swivel link downward out of the lower end of the head portion.

7. The lure according to claim 6, wherein the extending swivel is disposed along a line of action through the means for attaching a fish line which line of action is disposed between the centroid of the lure and the neck portion.

8. The lure according to claim 7, further including a swivel blade attached and depending from the retention means of the extending swivel link of the swivel.

9. The lure according to claim 8, wherein hook dressing is attached to the hook and disposed about the hook portion of the hook, the swivel being disposed below the hook for spinning movement clear of the hook dressing.

10. The lure according to claim 7, wherein the acute angle between the neck and head portions of the weight lies in a range between 55° and 75°.

11. The lure according to claim 10, wherein the weight comprises predominant eye spots disposed on opposite sides of the weight at the juncture of the neck and head portions of the weight, the head portion being tapered with a cross section of decreasing size toward the lower end of the head portion.

* * * * *

UNITED STATES PATENT AND TRADEMARK OFFICE
CERTIFICATE OF CORRECTION

PATENT NO. : 5,203,105  
DATED : April 20, 1993  
INVENTOR(S) : Bond et al.

Page 1 of 2

It is certified that error appears in the above-identified patent and that said Letters Patent is hereby corrected as shown below:

Column 2, Line 7, "water closely imitates the motion of the fish' prey seek-"

should read, --water closely imitates the motion of the fish's prey seek- --

Column 2, Line 17 "eager to strike at that moment when their pre starts to"

should read, --eager to strike at that moment when their prey starts to--

Column 5, Line 66, "the ga 59 also lies ideally in the plane of symmetry of the"

should read, --the gap 59 also lies ideally in the plane of symmetry of the--

UNITED STATES PATENT AND TRADEMARK OFFICE
CERTIFICATE OF CORRECTION

PATENT NO. : 5,203,105
DATED : April 20, 1993
INVENTOR(S) : A. Melvin Bond, et al It is certified that error appears in the above-indentified patent and that said Letters Patent is hereby corrected as shown below:

Column 8, line 53, "5°. Increasing the included angle beyond

75° toward a"

should read, --55°. Increasing the included angle beyond

75° toward a"

Signed and Sealed this

Eighteenth Day of January, 1994

Attest:

BRUCE LEHMAN

Attesting Officer      Commissioner of Patents and Trademarks